United States Patent
Heinemann et al.

(10) Patent No.: US 6,881,451 B2
(45) Date of Patent: Apr. 19, 2005

(54) PROCESS AND DEVICE FOR PRODUCING WEAR-RESISTANT, TRIBOLOGICAL CYLINDER BEARING SURFACES

(75) Inventors: Rolf Heinemann, Lehre (DE); Klaus Färber, Gifhorn (DE); Achim Sach, Langenargen (DE)

(73) Assignee: Volkswagen AG, Wolfsburg (DE)

( * ) Notice: Subject to any disclaimer, the term of this patent is extended or adjusted under 35 U.S.C. 154(b) by 14 days.

(21) Appl. No.: 09/933,053

(22) Filed: Aug. 20, 2001

(65) Prior Publication Data

US 2002/0069819 A1 Jun. 13, 2002

Related U.S. Application Data

(63) Continuation of application No. PCT/EP00/01020, filed on Feb. 9, 2000.

(30) Foreign Application Priority Data

Feb. 19, 1999 (DE) .......................................... 199 07 105

(51) Int. Cl.[7] .............................. B05D 3/00; C23C 14/30
(52) U.S. Cl. ........................ 427/554; 427/555; 427/556; 427/596; 427/597
(58) Field of Search ................................. 427/446, 455, 427/456, 595, 596, 597, 230, 233, 234, 236, 239; 219/121.6, 121.63, 121.65; 118/622, 641

(56) References Cited

U.S. PATENT DOCUMENTS

| 4,724,299 A | * | 2/1988 | Hammeke ................. 219/121.6 |
| 5,043,548 A | | 8/1991 | Whitney et al. |
| 5,080,056 A | * | 1/1992 | Kramer et al. ......... 123/193 CP |
| 5,359,172 A | | 10/1994 | Kozak et al. |
| 5,387,292 A | * | 2/1995 | Morishige et al. .......... 148/276 |
| 5,644,828 A | * | 7/1997 | Sailer et al. .............. 29/402.06 |
| 5,855,149 A | | 1/1999 | Islam et al. |
| 5,912,057 A | * | 6/1999 | Nishimura et al. .......... 427/597 |
| 6,095,107 A | * | 8/2000 | Kloft et al. ............... 123/193.2 |
| 6,197,386 B1 | * | 3/2001 | Beyer et al. ................. 427/450 |
| 6,221,504 B1 | * | 4/2001 | Pfeffinger et al. ........... 428/564 |
| 6,303,897 B1 | * | 10/2001 | Bady et al. ............ 219/121.65 |
| 2002/0153359 A1 | * | 10/2002 | Feikus ...................... 219/121.6 |

FOREIGN PATENT DOCUMENTS

| DE | 27 43 992 A1 | 4/1978 |
| DE | 41 30 207 A1 | 3/1993 |
| DE | 44 33 675 A1 | 3/1996 |
| DE | 195 30 641 C1 | 11/1996 |
| DE | 195 33 960 | 3/1997 |
| DE | 196 30 197 A1 | 1/1998 |
| DE | 196 43 029 A1 | 4/1998 |
| EP | 0 415 570 A2 | 3/1991 |
| EP | 0 580 534 A1 * | 7/1993 ............. C23C/4/02 |
| EP | 0 622 476 A1 | 11/1994 |
| EP | 0 818 261 | 1/1998 |
| EP | 0 837 152 A1 | 4/1998 |
| EP | 0 915 184 A1 | 5/1999 |
| EP | 0 950 461 A2 | 10/1999 |

* cited by examiner

Primary Examiner—Shrive P. Beck
Assistant Examiner—Eric B. Fuller
(74) Attorney, Agent, or Firm—Laurence A. Greenberg; Werner H. Stemer; Manfred Beck

(57) ABSTRACT

A process for producing a wear-resistant cylinder bearing surface includes rotating a laser about its longitudinal axis and simultaneously advancing the laser in a direction of the longitudinal axis which is coaxial with a cylinder of a crankcase. A powdery material is fed through the laser and a jet of the powdery material is directed toward the cylinder bearing surface. A laser beam is deflected to an impact region where the jet of the powdery material impinges on the cylinder bearing surface. The jet of the powdery material passes through the laser beam. The laser beam at least partially melts the impact region before the powdery material impinges on the impact region. A device for producing wear-resistant surfaces is also provided.

11 Claims, 1 Drawing Sheet

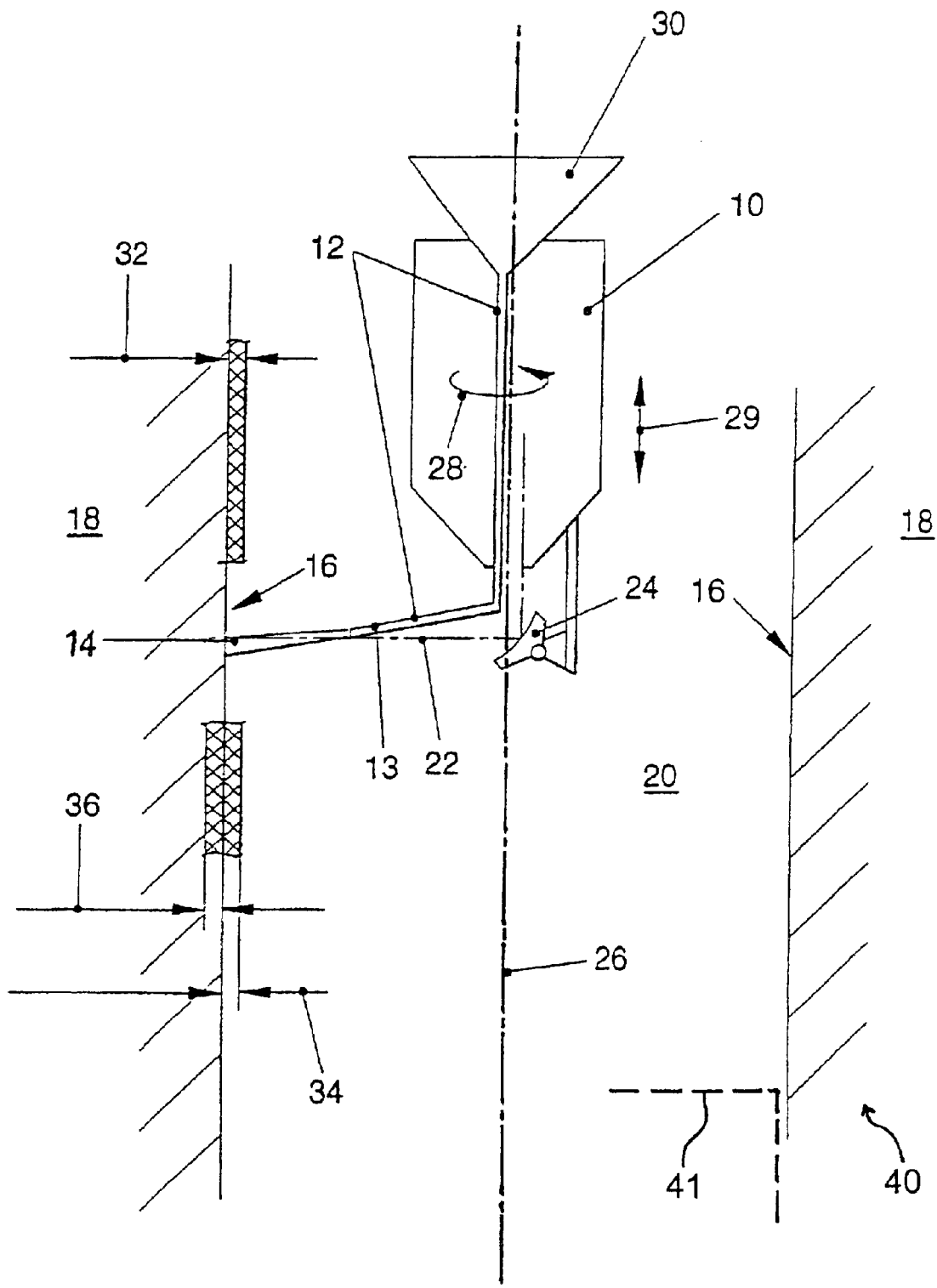

PROCESS AND DEVICE FOR PRODUCING WEAR-RESISTANT, TRIBOLOGICAL CYLINDER BEARING SURFACES

This application is a continuation of copending International Application No. PCT/EP00/01020, filed Feb. 9, 2000, which designated the United States.

BACKGROUND OF THE INVENTION

Field of the Invention

The invention relates to a process for producing wear-resistant, tribological cylinder bearing surfaces for pistons which run in cylinders of a crankcase of an internal-combustion engine. The invention also relates to a device for producing wear-resistant, tribological cylinder bearing surfaces for pistons which run in cylinders of a crankcase of an internal-combustion engine.

The hypoeutectic aluminum-silicon alloys, which are predominantly used for cylinder crankcases are unsuitable for the tribological loads of the piston/piston ring/cylinder bearing surface system, because of an insufficient level of the wear-resistant silicon phase. Hypereutectic alloys, e.g. the alloy AlSi$_7$Cu$_4$Mg, have a sufficient quantity of silicon crystallites. This hard, wear-resistant microstructural constituent is raised with respect to the matrix, which is formed of an aluminum mixed crystal, by chemical and/or mechanical machining stages, and forms a required load-bearing surface component. However, drawbacks are the lack of castability compared to hypoeutectic and virtually eutectic alloys, poor machining qualities, and the high costs of this alloy.

One possible way of avoiding this drawback is to cast in cylinder sleeves or liners made from a wear-resistant material, such as for example gray cast iron and hypereutectic aluminum alloys. In this case, however, the join between the sleeve and the surrounding casting, which is provided only by mechanical interlocking, causes problems. The use of a porous ceramic sleeve material makes it possible for this material to be infiltrated during the casting process, leading to a material-to-material bond. However, this requires a slow filling of the casting mold and the use of a high pressure, which makes the process considerably less economical.

Alternatively, hypoeutectic and almost eutectic alloys of electrodeposition coatings are applied directly onto the cylinder bearing surfaces. However, this is expensive and these coatings cannot sufficiently withstand tribochemical loads. A further alternative are thermally sprayed layers, which are likewise applied directly to the cylinder bearing surfaces. However, the adhesive strength of these layers is insufficient, since they are joined only by a micromechanical interlocking.

Therefore, it has already been proposed to carry out the surface modifications of remelting, alloying-in, dispersing and coating, by using a laser, as is disclosed, for example, in Published, Non-Prosecuted German Patent Application No. DE 196 43 029 A1.

Published European Patent Application No. EP 0 622 476 A1 describes a process for applying laser-induced MMC coatings (MMC=Metal Matrix Composite) to metal substrates. During the coating of a substrate surface, a jet of inert gas, which carries a powder mixture, passes through a laser beam, the laser beam being directed onto the surface where the powder mixture impinges on the substrate surface. This coating process has the drawback that the separate guidance of the laser beam and of the powder jet is complex as well as expensive and time-consuming.

Published European Patent Application No. EP 0 837 152 A1 discloses a process for coating a component of an internal-combustion engine with silicon, wherein the component is formed of an aluminum alloy. Here, a laser beam is directed from a rotating device onto a cylinder inner surface through the use of a mirror. Furthermore, this document describes a powder supply device, which conveys the coating powder toward the surface, which is to be treated. The coating powder is completely melted by the laser beam before it comes into contact with the surface, which is to be coated. The coating material is therefore applied in the form of molten droplets to the surface which is to be coated, while it is intended that the microstructure of the material to be coated should not be changed at its surface.

This known coating process has the drawback that the coating material is only applied to the surface of the component to be coated. The coating material cannot be alloyed into the surface of the component and a corresponding change to the microstructure at the surface of the component which is to be coated cannot occur.

SUMMARY OF THE INVENTION

It is accordingly an object of the invention to provide a process and a device for producing a wear-resistant, tribological cylinder bearing surface in a cylinder of a crankcase of an internal-combustion engine which overcome the above-mentioned disadvantages of the heretofore-known processes and devices of this general type and which allow carrying out a locally accurate surface treatment in a simple way.

With the foregoing and other objects in view there is provided, in accordance with the invention, a process for producing a wear-resistant, tribological cylinder bearing surface for a piston running in a cylinder of a crankcase of an internal-combustion engine, the process includes the steps of:

positioning a laser such that a longitudinal axis of the laser is substantially coaxial to a cylinder of a crankcase of an internal-combustion engine;

rotating the laser about the longitudinal axis of the laser and simultaneously advancing the laser in a direction of the longitudinal axis of the laser;

feeding a powdery material through the laser and directing a jet of the powdery material to a cylinder bearing surface of the cylinder;

deflecting a laser beam to an impact region where the jet of the powdery material impinges on the cylinder bearing surface and guiding the jet of the powdery material such that at least part of the jet of the powdery material passes through the laser beam; and at least partially melting, with the laser beam, a surface of the impact region such that the surface of the impact region is at least partially melted before the powdery material impinges on the surface of the impact region.

In other words, according to the invention, a process for producing wear-resistant, tribological cylinder bearing surfaces for pistons which run in cylinders of a crankcase of an internal-combustion engine, includes guiding a jet of a powdery material through a laser beam from a laser, wherein the laser beam is directed onto a surface where the jet impinges on the cylinder bearing surface, wherein the laser is disposed coaxially with the cylinder, rotates about its longitudinal axis and is simultaneously advanced in the direction of the longitudinal axis, and wherein the laser beam is deflected toward the surface where the jet impinges on the cylinder bearing surface, the powdery material being fed through the rotating laser in such a way that the surface where the powder jet impinges on the cylinder bearing surface is partially melted by the laser beam before the powdery material impinges on the surface.

This has the advantage that there are no longer any interfaces or boundaries between the materials of the crankcase and the wear-resistant cylinder bearing surface, as is the case with inserted gray-cast iron sleeves. The fact that the gray-cast iron sleeves are no longer required leads to a reduction in weight and therefore a saving on fuel. Optimum heat transfer between the materials is ensured. The invention can be used for all aluminum surfaces, irrespective of what casting process is used to produce the component to be treated. Accurate adjustability of the alloying-in or the coating, accurate determination of the thickness of the coating application and of the alloying-in depth and an accurate point determinability or surface determinability of the alloying-in process or of the coated surface is ensured. The accurate adjustment or high variability of the alloying process and of the application process allows to dispense with a number of processing steps, such as for example a rough preliminary spindle machining, which results in corresponding cost savings during manufacture. With the exception of a possibly performed honing/lapping process, the preliminary machining or preliminary processing is eliminated which results in corresponding savings on the manufacturing costs. It is also possible to use a porous casting containing voids or blow holes, since the precise control or, if appropriate, a double application allows to fill the voids. The invention can be used for planar, concave and convex surfaces and also for bores and tubes. The improved cylinder bearing surface minimizes a power loss caused by friction and consequently minimizes fuel consumption. A blank length can be reduced, which leads to a saving on weight during casting. It is possible, in a controlled, selective and precise way, to only treat desired surfaces, such as for example the top dead center and bottom dead center in the cylinder of the crankcase, resulting in a corresponding cost saving. A correspondingly reduced installation clearance between a piston ring and the cylinder bore results in a reduced oil consumption. In connection with this, it is possible to reduce a piston ring tension. The surfaces treated according to the invention are suitable for honing, since it is possible to apply a thick coating. The invention is also suitable for repairs or repair steps, since the wear-resistant layer can be determined precisely.

According to a preferred mode of the invention, particular structures, such as for example oil pockets, are preferably introduced by using an additional laser treatment, wherein the structures are produced by vaporization or knocking out a generated molten material.

The powdery material is expediently a silicon-containing material, a tungsten-containing material and/or a nickel-containing material.

According to another mode of the invention, the laser energy is selected or adjusted in such a manner that a depositing and/or alloying-in of the powdery material, which passes through or traverses the laser beam and is transported in the jet, takes place.

Expediently, a rotational speed of the laser, a translational speed of the laser and a laser energy are selected in such a manner that the powdery material is applied with a thickness of approximately 800 µm to 1000 µm or an alloying-in with a penetration depth of approximately 250 µm with a simultaneous application with a thickness of approximately 250 µm takes place.

The laser energy is, for example, approximately 2 kW. The laser optionally passes through the cylinder a number of times or just once for the purpose of carrying out operating steps. A single pass of the laser is particularly preferred.

With the objects of the invention in view there is also provided, a device for producing a wear-resistant, tribological cylinder bearing surface in a cylinder of a crankcase of an internal-combustion engine, including:
a laser for providing a laser beam;
a powder feed device extending trough the laser;
the powder feed device being configured to guide a jet of a powdery material through the laser beam and to guide the jet of the powdery material to an impact region on a cylinder bearing surface where the powdery material impinges on the cylinder bearing surface; and
a beam-deflecting device operatively connected to the laser, the beam-deflecting device deflecting the laser beam onto the impact region where the powdery material impinges on the cylinder bearing surface.

In other words, a device for producing wear-resistant, tribological cylinder bearing surfaces for pistons which run in cylinders of a crankcase of an internal-combustion engine, includes a laser and a powder feed device, which guides a jet of a powdery material through a laser beam of the laser, wherein the powder feed device is disposed so that it extends through the laser, and wherein a beam-deflecting device for the laser beam is disposed in such a manner that it deflects the laser beam onto a point where the jet with the powdery material impinges on the cylinder bearing surface.

This has the advantage that the laser and the powder supply device can be disposed coaxially with respect to the cylinder and, through simple rotation of the laser and a simultaneous translational movement thereof along a cylinder axis, the cylinder bearing surface is produced in the cylinder.

The beam-deflecting device expediently includes at least a mirror, optical fibers and/or a lens system.

With the objects of the invention in view there is further provided, in combination with a crankcase having a cylinder, a device for producing a wear-resistant, tribological cylinder bearing surface in the cylinder, the device including:
a laser for providing a laser beam, the laser being positioned coaxial with respect to the cylinder;
a powder feed device extending trough the laser;
the powder feed device being configured to guide a jet of a powdery material through the laser beam and to guide the jet of the powdery material to an impact region on a cylinder bearing surface where the powdery material impinges on the cylinder bearing surface; and
a beam-deflecting device operatively connected to the laser, the beam-deflecting device deflecting the laser beam onto the impact region where the powdery material impinges on the cylinder bearing surface.

Other features which are considered as characteristic for the invention are set forth in the appended claims.

Although the invention is illustrated and described herein as embodied in a process and a device for producing wear-resistant, tribological cylinder bearing surfaces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a diagrammatic sectional view of a preferred embodiment of the device according to the invention disposed coaxial with respect to a cylinder in a crankcase of an internal combustion engine.

DESCRIPTION OF THE PREFERRED EMBODIMENTS

Referring now to the single FIGURE in detail, there is shown a preferred embodiment of a device according to the invention which includes a laser 10 and a powder supply device 12, which guides a jet 13 of a powdery material, in a system of tubes, through the laser 10 and guides it toward a focal and fusion point 14 on a cylinder bearing surface 16 of a cylinder wall 18 of a cylinder 20, in such a manner that, after the powder jet 13 emerges from the powder supply device 12, the jet 13 intersects or passes through a laser beam 22 from the laser 10. Furthermore, a beam-deflecting device 24, which deflects the laser beam 22 toward the focal and fusion point 14, is provided on the laser 10. The cylinder 20 is formed in a crankcase 40 for an internal combustion engine. A piston 41, which is only schematically indicated by a dashed line, is to be fitted into the cylinder 20 when the internal combustion engine is assembled.

The combination of the laser 10 and the powder supply device 12 is provided coaxially with respect to a center axis 26 of the cylinder 20 and can rotate about this axis 26, as indicated by arrow 28. Furthermore, the combination of the laser 10 and the powder supply device 12 can be displaced along the axis 26 in the manner of a translational movement, as is indicated by arrow 29. Furthermore, there is a funnel or hopper 30 for feeding powder to the powder supply device 12.

The rotational and translational movements lead to a corresponding covering or sweeping over the cylinder bearing surface and therefore result in a treatment of the cylinder bearing surface 16. A thickness of applied (deposited) material is indicated by reference numerals 32 or 34, and a penetration depth is indicated by reference numeral 36.

The laser 10 is used to produce wear-resistant, tribological cylinder bearing surfaces 16 on cylinder walls 18 of an aluminum crankcase, by feeding silicon-containing, tungsten-containing and/or nickel-containing materials or hard materials, by alloying into the aluminum surfaces 16 or coating onto the aluminum surfaces 16. The feeding of the hard materials takes places within, i.e. through, the rotating laser 10. In this case, the material to be supplied is preferably in powder form.

The tribologically suitable, wear-resistant layer produced in this way can, in terms of its thickness, he adjusted as desired through the use of controllable parameters, such as the size of the affected zone or the structure and number of elements that are supplied. In addition, an increase in variability is achieved by the advance 29, by the precise metering of the supplied material and by the power of the rotating laser 10, so that a bead position and bead height can be finely or roughly structured.

When performing the coating, application thicknesses 32 of approximately 800 μm to 1000 μm are preferred. Also, when performing the coating, a penetration depth 36 of approximately 250 μm and at the same time an application thickness 34 of approximately 250 μm is achieved with a laser power of approximately 2 kW. The wear-resistant parts are preferably exposed by chemical or mechanical abrasion.

We claim:

1. A process for producing a wear-resistant, tribological cylinder bearing surface for a piston running in a cylinder of a crankcase of an internal-combustion engine, the process which comprises:

positioning a laser such that a longitudinal axis of the laser is substantially coaxial to a cylinder of a crankcase of an internal-combustion engine;

rotating the laser about the longitudinal axis of the laser and simultaneously advancing the laser in a direction of the longitudinal axis of the laser;

feeding a powdery material through the laser and directing a jet of the powdery material to a cylinder bearing surface of the cylinder;

deflecting a laser beam to an impact region where the jet of the powdery material impinges on the cylinder bearing surface and guiding the jet of the powdery material such that at least part of the jet of the powdery material passes through the laser beam; and at least partially melting, with the laser beam, a surface of the impact region such that the surface of the impact region is at least partially melted before the powdery material impinges on the surface of the impact region; and forming given structures in the cylinder bearing surface by using an additional laser treatment.

2. The process according to claim 1, which comprises forming oil pockets in the cylinder bearing surface by using the additional laser treatment.

3. The process according to claim 1, which comprises using, as the powdery material, at least one material selected from the group consisting of a silicon-containing material, a tungsten-containing material and a nickel-containing material.

4. The process according to claim 1, which comprises adjusting a laser energy such that the powdery material, which passes through the laser beam and is transported in the jet, is deposited on the cylinder bearing surface.

5. The process according to claim 1, which comprises adjusting a laser energy such that the powdery material, which passes through the laser beam and is transported in the jet, is alloyed into the cylinder bearing surface.

6. The process according to claim 1, which comprises adjusting a laser energy such that the powdery material, which passes through the laser beam and is transported in the jet, is alloyed into the cylinder bearing surface and is deposited on the cylinder surface.

7. The process according to claim 1, which comprises selecting a given rotational speed for the step of rotating the laser about the longitudinal axis of the laser, selecting a given translational speed for the step of advancing the laser in the direction of the longitudinal axis of the laser and selecting a given laser energy such that the powdery material is deposited with a layer thickness of substantially 800 μm to 1000 μm.

8. The process according to claim 1, which comprises selecting a given rotational speed for the step of rotating the laser about the longitudinal axis of the laser, selecting a given translational speed for the step of advancing the laser in the direction of the longitudinal axis of the laser and selecting a given laser energy such that the powdery material is alloyed into the cylinder bearing surface with a penetration depth of substantially 250 μm and such that at the same time the powdery material is deposited with a layer thickness of substantially 250 μm.

9. The process according to claim 1, which comprises operating the laser with a laser energy of substantially 2 kW.

10. The process according to claim 1, which comprises advancing the laser such that the laser passes only once through the cylinder for performing operating steps.

11. The process according to claim 1, which comprises advancing the laser such that the laser passes several times through the cylinder for performing operating steps.

* * * * *